Patented Aug. 7, 1934

1,969,183

UNITED STATES PATENT OFFICE 1,969,183

COMPOSITION OF MATTER

Ernest W. Reid, Pittsburgh, Pa., assignor to Carbide and Carbon Chemicals Corporation, a corporation of New York No Drawing. Application September 23, 1931, Serial No. 564,709

3 Claims. (Cl. 106—40)

This invention relates to compositions containing cellulose acetate, and discloses solvents for preparing such compositions. My new solvents are mixtures of propylene dichloride ($CH_3.CHCl.CH_2Cl$) together with the lower aliphatic alcohols.

Attempts have been made in the past to utilize the solvent properties of various chlorinated compounds in forming cellulose acetate compositions. Aging tests upon cellulose acetate compositions formed from the previously suggested chlorinated compounds, for example carbon tetrachloride, have demonstrated that such compositions undergo a gradual and steady deterioration upon standing.

Propylene dichloride and the lower aliphatic alcohols individually are non-solvents for cellulose acetate, but I have discovered that when a small amount of an alcohol having less than three carbon atoms in its structure, such as methyl or ethyl alcohol, is added to propylene dichloride, the mixture becomes an excellent solvent for cellulose acetate and is useful in preparing lacquers, dopes and the like. Aging tests upon cellulose acetate compositions formed from my new solvent mixtures demonstrate that these compositions do not deteriorate when allowed to stand for long periods of time.

I prefer to use mixtures containing about 70% by volume of propylene dichloride and about 30% by volume of methyl or ethyl alcohol. Other proportions and mixtures of these two alcohols or other alcohols may be used. In this connection it may be said that although alcohols above ethyl alcohol in the aliphatic series are not strictly inoperative in my new solvent mixtures, combinations of the higher alcohols with propylene dichloride are not good solvents for cellulose acetate. For this reason, methyl and ethyl alcohols are preferred.

Compositions containing cellulose acetate dissolved in mixtures of propylene dichloride and ethyl or methyl alcohol may be extended or diluted with various non-solvents or diluents in the usual manner. For this purpose the customary diluents such as benzene, toluene, or xylene, may be used.

I claim:

1. A composition of matter consisting of cellulose acetate dissolved in a mixture consisting of propylene dichloride and at least one of the group consisting of methyl and ethyl alcohols.

2. A composition of matter consisting of cellulose acetate dissolved in a mixture consisting of propylene dichloride and methyl alcohol.

3. A composition of matter consisting of cellulose acetate dissolved in a mixture consisting of propylene dichloride and ethyl alcohol.

ERNEST W. REID.